US008577889B2

(12) United States Patent
Dahl et al.

(10) Patent No.: US 8,577,889 B2
(45) Date of Patent: Nov. 5, 2013

(54) SEARCHING FOR TRANSIENT STREAMING MULTIMEDIA RESOURCES

(75) Inventors: Austin D. Dahl, Seattle, WA (US); Jennifer L. Kolar, Seattle, WA (US); Theodore G. Diamond, Seattle, WA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 11/489,273

(22) Filed: Jul. 18, 2006

(65) Prior Publication Data
US 2008/0021874 A1 Jan. 24, 2008

(51) Int. Cl.
G06F 7/00 (2006.01)
G06F 17/30 (2006.01)

(52) U.S. Cl.
USPC ............................ 707/740; 707/741; 707/746

(58) Field of Classification Search
USPC ............................................................. 707/3
See application file for complete search history.

(56) References Cited

U.S. PATENT DOCUMENTS

| 5,943,605 | A | * | 8/1999 | Koepele, Jr. | 725/114 |
| 5,983,005 | A | * | 11/1999 | Monteiro et al. | 709/231 |
| 5,999,934 | A | * | 12/1999 | Cohen et al. | 707/696 |
| 6,332,163 | B1 | * | 12/2001 | Bowman-Amuah | 709/231 |
| 6,374,260 | B1 | * | 4/2002 | Hoffert et al. | 1/1 |
| 6,434,622 | B1 | * | 8/2002 | Monteiro et al. | 709/231 |
| 6,477,580 | B1 | * | 11/2002 | Bowman-Amuah | 709/231 |
| 6,996,390 | B2 | * | 2/2006 | Herley et al. | 455/345 |
| 7,058,720 | B1 | * | 6/2006 | Majidimehr | 709/231 |
| 2002/0060750 | A1 | * | 5/2002 | Istvan et al. | 348/569 |
| 2003/0007095 | A1 | * | 1/2003 | Freimann | 348/563 |
| 2003/0018799 | A1 | | 1/2003 | Eyal | |
| 2003/0061095 | A1 | * | 3/2003 | Kamada et al. | 705/14 |
| 2003/0084283 | A1 | * | 5/2003 | Pixton | 713/163 |
| 2003/0120793 | A1 | * | 6/2003 | Marjola | 709/231 |
| 2003/0135612 | A1 | * | 7/2003 | Huntington et al. | 709/224 |
| 2003/0140159 | A1 | * | 7/2003 | Campbell et al. | 709/231 |
| 2004/0030682 | A1 | * | 2/2004 | Porter et al. | 707/3 |
| 2004/0128694 | A1 | * | 7/2004 | Bantz et al. | 725/95 |
| 2004/0177063 | A1 | * | 9/2004 | Weber et al. | 707/3 |
| 2004/0177096 | A1 | | 9/2004 | Eyal et al. | |
| 2005/0050022 | A1 | * | 3/2005 | Dukes et al. | 707/3 |
| 2005/0125569 | A1 | * | 6/2005 | Swidler et al. | 710/8 |
| 2005/0187965 | A1 | | 8/2005 | Abajian | |
| 2005/0222981 | A1 | * | 10/2005 | Lawrence et al. | 707/3 |

(Continued)

OTHER PUBLICATIONS

Bill Birney; Intelligent Streaming;Microsoft; 2003.*

(Continued)

*Primary Examiner* — Shew-Fen Lin
*Assistant Examiner* — Jermaine Mincey
(74) *Attorney, Agent, or Firm* — Finnegan, Henderson, Farabow, Garrett & Dunner, LLP

(57) ABSTRACT

A software and/or hardware facility is described that enables searches for transient multimedia resources that are contained in real-time multimedia streams. Because real-time data streams are not archived for subsequent access, transient resources contained in the streams are preferably quickly identified, characterized in a database, and indexed so that the facility can locate transient resources that are responsive to search queries. Stream listeners are disclosed that are configured to monitor data streams and identify transient resources within the streams based on associated metadata. Various techniques are disclosed to optimize the operation of the stream listeners. In response to a search query, search results are generated by the facility that include transient multimedia resources that are accessible via a network at the time that the search query is received.

33 Claims, 6 Drawing Sheets

(56) References Cited

U.S. PATENT DOCUMENTS

| | | | |
|---|---|---|---|
| 2005/0240588 A1* | 10/2005 | Siegel et al. | 707/9 |
| 2005/0278739 A1* | 12/2005 | Yaksick et al. | 725/41 |
| 2006/0020589 A1* | 1/2006 | Wu et al. | 707/3 |
| 2006/0080295 A1* | 4/2006 | Elsaesser et al. | 707/3 |
| 2006/0085392 A1* | 4/2006 | Wang et al. | 707/3 |
| 2006/0095420 A1* | 5/2006 | Ikegami et al. | 707/3 |
| 2006/0136401 A1* | 6/2006 | Normington | 707/3 |
| 2006/0149709 A1* | 7/2006 | Krakirian et al. | 707/3 |

OTHER PUBLICATIONS

Indexing Multimedia for Internet; Brian Eberman; Visual'99; Springer-Verlag Berlin Hdidelberg; pp. 196-203.*

"Current Playlist," KCUV 102.3 FM, <http://www.kcuvradio.com/under_playlist.asp> Accessed Apr. 11, 2006, 1 page.

"What's on now," PublicRadioFan.com, <http://www.publicradiofan.com/cgi-bin/whatson.pl> Accessed on Apr. 11, 2006, 2 pages.

* cited by examiner

| server location | stream | | | sampling parameters | |
|---|---|---|---|---|---|
| URL | format | bitrate | category | type | rate |
| www.media.com/highlights | windows | 128k | alternative | category 1 | 5 sec. |
| www.real.com/topvideo | real | 256k | general | category 5 | 1 min. |
| ... | | | | | |

FIG. 3

| terms | index | | | | | |
|---|---|---|---|---|---|---|
| Santana | p1 | p2 | p3 | p4 | p5 | |
| Siouxsie | p1 | p2 | p3 | | | |
| Sting | p1 | p2 | p3 | p4 | p5 | p6 |
| ... | | | | | | |

FIG. 4

SEARCHING FOR TRANSIENT STREAMING MULTIMEDIA RESOURCES

TECHNICAL FIELD

The described technology relates to the field of multimedia search techniques.

BACKGROUND

Searching refers to a process in which a user submits a query, such as a list of keywords, and receives in return a search result. The search result is a set of one or more resources in a search domain that are determined to be responsive to the query by a search algorithm. It is typical for queries to be processed against a search index that corresponds to a desired search domain. For example, a query may be applied against a search index corresponding to a search domain of web documents, such as web pages or other textual documents available via the Internet, to produce a result containing a list of links to web documents satisfying the query. A query may similarly be applied against a search index corresponding to a multimedia search domain, to produce a result containing a list of links to multimedia resources satisfying the query. For example, the search query "Santana" applied against a multimedia search index could identify a link to a multimedia resource corresponding to the song "Smooth" by the band Santana.

The conventional approach to indexing a search domain involves populating the search index using web crawling techniques. Such web crawling techniques typically involve automatically examining all or portions of the World Wide Web in a methodical manner to identify resources, and queuing information about visited resources for later processing to add these resources to an index. Depending on the scope of the crawl, such techniques can involve long update cycles—for example, the web crawl might run every three days and therefore the index would only be updated every three days. Because of the time required to complete the crawl, this method of indexing is better suited for indexing some types of resources over others. For example, this method of indexing is generally quite suitable for identifying multimedia resources that are available for relatively long periods of time. An example of a multimedia resource that may be accessible for an extended period is a link to a Santana song on Santana's homepage (santana.com). As long as the band Santana continues to enjoy consumer success, it is likely that a user will be able to select and play a Santana audio or video clip from the website at any time during the future (whether weeks, months, or years).

In contrast to such "static" multimedia resources that are available for long periods of time, some publishers make available transient multimedia resources as part of a data stream. For example, a publisher may offer programming from a radio station over the Internet as a digitized stream so that listeners do not have to be in geographic proximity to a broadcast tower in order to enjoy the station programming. When provided over the Internet as an audio stream, the programming is typically "real-time" in the sense that the station does not store or archive the transmitted content in a manner that can be easily accessed by users in the future. Instead, users are only able to receive and play the content that is presently being broadcast by the station. That is, a user accessing a station via the Internet half-way through the broadcast of a song is usually precluded from "rewinding" or otherwise listening to the song from the start. Instead, the user is only able to listen to the remaining portion of the song that hasn't been broadcast. In this sense, all of the multimedia resources contained in a real-time data stream—whether they are songs, interviews, traffic reports, weather updates, or any other content in audio, video, audio/video, and/or other form—may be considered to be "transient" since they are only accessible via the Internet for an instant of time. Unless stored by the user, each multimedia resource can only be accessed for the period that the resource is broadcast. Of course, real-time multimedia data streams vary significantly between publishers and may be produced in any of a variety of media types, in various encoding formats, and at various quality levels. Some multimedia resources broadcast in a real-time data stream may be "live" in the sense that the media content is being created contemporaneously with its broadcast, while other multimedia content may be preexisting content that is presented in the real-time data stream.

Because transient multimedia resources are only accessible for a brief instant of time, conventional indexing techniques used to identify static multimedia resources are not suitable for transient multimedia resources for at least two reasons. First, conventional indexing techniques that identify a real-time multimedia data stream are often only able to index the data stream based on general metadata associated with that stream. For example, a stream might be identified as "swing music from the 40s," but the indexing would not be able to identify particular artists or song titles that are included in the stream. As a result, users searching for a particular artist may not know about the inclusion of the artist in a particular data stream because the metadata associated with the stream does not include such information. Second, even if the indexing technique was able to identify a particular artist that was being played on the stream at the time of indexing, because of the delay associated with most crawls such an index would quickly become out of date. Users searching for a particular artist would be unable to find the artist in a particular data stream because all or some of the results may be stale (meaning that a user selecting a search result and being redirected to a stream would not find the artist they were seeking in the stream) or no results may be returned even though the artist should be found in a stream if the stream were being indexed in a timely fashion. In each case, the user is unable to locate a desired result responsive to their search query.

In view of the above-discussed disadvantages of conventional approaches, a more effective approach to indexing transient multimedia resources would have substantial utility.

BRIEF DESCRIPTION OF THE DRAWINGS

FIG. 3 is a block diagram that illustrates records in the multimedia stream database.

FIG. 4 is a block diagram that illustrates records in a transient multimedia index.

DETAILED DESCRIPTION

Figure 1:
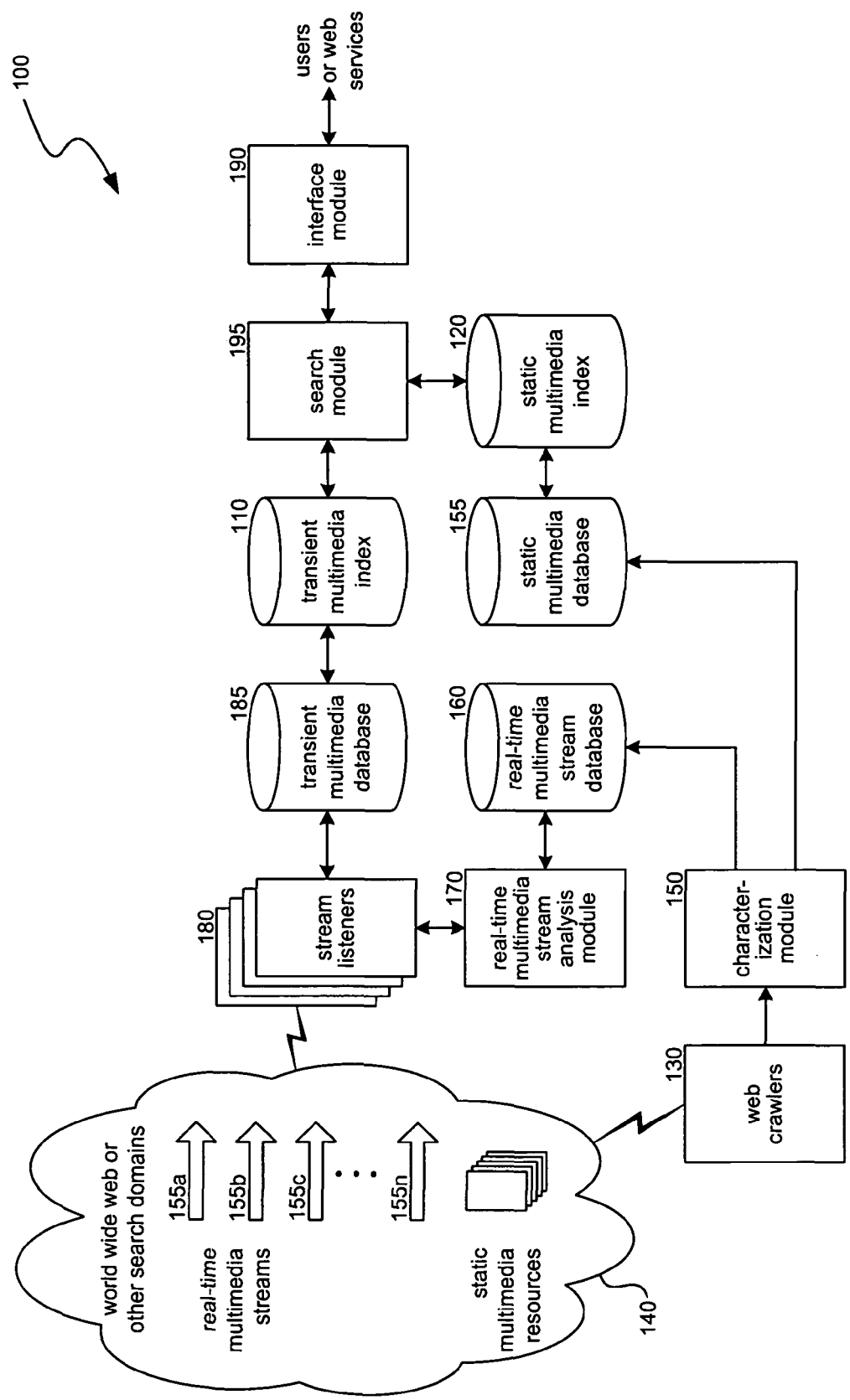
FIG. 1 is a block diagram that illustrates components of a facility for searching for transient multimedia resources.

A software and/or hardware facility is described that enables searching for transient multimedia resources, either alone or in conjunction with searching for static multimedia resources. Transient multimedia resources are those audio, video, audio/video or other media resources that are typically delivered via a real-time data stream and accessible via a network for only a short period of time. Because transient multimedia resources are only available for brief periods, the facility uses special techniques to identify the transient multimedia resources, update a database of the transient resources, and quickly map the database to a search index for transient multimedia resources that may be accessed by users or other applications. Static multimedia resources are those audio, video, audio/video or other media resources that are available for access via a network for an extended period of time. In some embodiments, the facility also identifies static multimedia resources, stores them in a database, and indexes the static resources, but the timeframe for doing so may be longer because of the longevity of these resources. By maintaining the currency of the transient and static indices, end users are able to search for and accurately identify those media resources that are available at the time the search inquiry is made.

In some embodiments, the facility identifies a number of real-time multimedia streams that contain transient multimedia resources. Each real-time multimedia stream is analyzed to determine the characteristics of the stream, including, but not limited to: (i) the format of the stream (e.g., RealAudio®, Quicktime®, Windows® Media, MP3, Macromedia Flash®, etc.); (ii) the data rate of the stream (e.g., 48K, 128K, 256K, 750K, etc.); and (iii) any metadata associated with the stream that may characterize the stream (e.g., information related to the content of the stream, information related to the intellectual property embedded in the stream, information related to the technical aspects of the stream, etc.). Once a real-time multimedia stream has been accurately characterized, a stream listener may be configured to automatically monitor the stream and identify transient multimedia resources that are contained in the stream. Depending on the format of the stream, such listeners may monitor the stream continuously or may be able to monitor the stream on a periodic basis. In certain situations, not all identified real-time multimedia streams may need to be monitored. For example, sometimes data streams containing the same multimedia resources are available at different data rates, e.g., a low-bandwidth stream at 48K for dial-up users and higher bandwidth streams at 128K and 256K for broadband users, or in different formats, e.g., RealAudio and Quicktime. In such situations, only one of the data streams needs to be monitored to identify transient multimedia resources. Once identified, the information about the resources may be replicated for the other multimedia data streams having different rates or formats.

In some embodiments, after a stream listener has been configured for a real-time multimedia stream it may begin to monitor the stream in order to identify the transient multimedia resources that are contained in the stream. It will be appreciated that the content and length of transient resources in a stream may vary considerably from stream-to-stream. For example, an online radio may produce an audio multimedia stream with frequent transitions between songs, commercial breaks, live interviews, and news segments. The identity of the transient audio resource in the online radio stream may therefore change every few minutes. In contrast, an online video stream may contain transient video resources that last for an hour or more. The stream listeners are designed to monitor the multimedia stream to identify the transient resource that is currently being streamed, but more importantly to look for transitions in the stream that indicate the end of one media resource and the start of the next media resource.

It is beneficial to identify transitions, since the sooner a new resource can be added to a database and indexed, the faster the resource can be located. When a transition is detected, the listener identifies information about the new transient resource. The facility may obtain such information from a variety of in-band and out-of-band sources. For example, the facility may extract embedded metadata from the data streams that identifies the content of the stream. Such metadata may be interspersed with or embedded in the resource, for example, in a header packet or in periodic packets containing metadata information that are in addition to or combined with packets containing the transient resource. Alternatively, some media publishers may offer a schedule on a web page that reflects the current content playing in a real-time multimedia steam, may offer an RSS or other feed to indicate the content in a real-time stream, or may offer a second metadata-only stream that is associated with a real-time stream. Regardless of the source of the information, when a listener detects that a new transient resource is contained in the stream it updates a transient multimedia database to reflect the current resource that is available if the stream were to be accessed. Note that the database record containing the immediately preceding resource in the stream is typically deleted or overwritten, as a user accessing the stream would no longer be able to access the preceding resource. A transient multimedia index is then quickly updated to map search terms to the transient multimedia database and enable searches to locate transient resources that are responsive to a search query.

In some embodiments, the facility maintains a pair of indices used to satisfy queries: a static multimedia index containing information about static media resources and a transient multimedia index containing information about transient media resources. The static multimedia index is updated using conventional techniques. In contrast, the transient multimedia index is typically updated on a frequent basis so that the index accurately reflects the media resources that are currently being streamed in a number of real-time multimedia streams. When a search query is received, the facility may perform a search of both indices and return static media results and transient media results that are responsive to the query. By providing multimedia search capability as described above, the facility provides an enhanced search experience by opening up a broader range of media sources that match a user's interests.

FIG. 1 is a block diagram that illustrates the components of a facility 100 that is used to implement a search for transient and static multimedia resources in one embodiment. The facility utilizes a transient multimedia index 110 and a static multimedia index 120. Transient multimedia index 110 is an index that is frequently updated to maintain an accurate record of all transient multimedia resources that have been identified by the facility. Static multimedia index 120 is an index that is updated to reflect all static multimedia resources that have been identified by the facility. Because the number of static resources is often greater than the number of transient resources that are indexed, and because the transient index may be refreshed more frequently than the static index, different techniques may be used to construct and maintain each index. The techniques may be optimized for processing static resources and transient resources in general, and optimized for constructing and maintaining indices in particular. The indices map search terms to databases of multimedia resources that may be found on the World Wide Web, on any computer network, on any telecommunications network, or any other resource domain containing multimedia.

The multimedia resources may initially be found using a variety of techniques. One technique for identifying the multimedia resources is to use web crawlers 130 to crawl World Wide Web pages or other search domains 140. Another is to rely on human editors to search for and identify such resources. Still another technique is for publishers of multimedia resources to notify or otherwise register their multimedia resources with the facility. For example, a technique for locating multimedia resources is described in U.S. patent application Ser. No. 10/432,258 entitled "System and Process for Network Site Fragmented Search" (filed 21 May 2003) which is hereby incorporated by reference in its entirety. It will be appreciated that the technique use to locate multimedia resource may depend on the size of the search domain, the type of resources being located (e.g. static versus transient) or on other factors.

Media resources that are identified as part of a crawl or other technique are analyzed by characterization module 150 which sorts the identified resources into one of two types—static or transient. Certain multimedia resources that may be found are available for extended periods of time. That is, a user or other application may be able to access the identified resource now or in the future. Typically such resources are made available by a publisher until a time that the publisher determines that the resource should no longer be made available. Resources that have no known temporal restriction on when they can be accessed are characterized as "static" multimedia resources. The characterization module 150 stores a pointer to each identified static resource in the static multimedia database 155. In addition to a pointer to the resource, the characterization module stores other metadata that it identifies as being associated with the resource, and which may subsequently be useful to the facility to determine when a static resource is responsive to a user's search query. Such metadata may include, but not be limited to, information related to the content of the multimedia resource, such as the title of the resource, the author, the genre, reviews about the resource, or any other identifying information which would help characterize the content of the static multimedia resource. The metadata may also include any technical characteristics about the stored resource, such as the format of the resource or the data rate of the resource.

After characterizing information about each static multimedia resource is stored in the static multimedia database 155, a static multimedia index 120 is created. The static multimedia index is a searchable index that correlates search queries with records in the static multimedia database. Static multimedia index 120 may be created using any of a variety of techniques that are known in the art, such as those disclosed in U.S. patent application Ser. No. 10/432,306 entitled "System and Process for Searching a Network" (filed 21 May 2003) which is hereby incorporated by reference in its entirety. The static multimedia database 155 may be periodically modified or supplemented if better information about each resource becomes available, and static multimedia index 120 may be periodically rebuilt to optimize searching of the database 155.

In contrast to static multimedia resources which are always available, the characterization module 150 may also identify a number of real-time multimedia streams that contain transient multimedia resources. As described above, real-time multimedia streams are those streams that may be characterized as a "live" broadcast, meaning that the producer of the stream typically does not store or allow users to easily access historical portions of the stream. When the characterization module 150 identifies a real-time multimedia stream 155a-155n, it stores a pointer to the location of that stream in real-time multimedia stream database 160. Depending upon the size of the resource domain 140 that is being crawled by the web crawler 130, the number of static multimedia resources identified by the characterization module 150 typically exceeds the number of real-time multimedia streams 160 that the characterization module identifies.

In an embodiment, on a periodic basis a real-time multimedia stream analysis module 170 analyzes the format and content of each multimedia stream identified in the multimedia stream database 160. Specifically, for each stream identified in the database, multimedia stream analysis module 170 analyzes the stream to determine the characteristics of the stream including, but not limited to, the format of the stream (e.g., Real Audio, Quicktime, Windows Media, MP3, Macromedia Flash, etc.), the data rate of the stream (e.g., 48 k, 128 k, 256 k, 750 k, etc.), and any metadata associated with the stream that may characterize the stream. The metadata associated with the stream may include items such as a description of the genre of the stream (e.g., pop radio, news, classic videos, educational programming, etc.), information about the content producer and distributor (e.g., the New York Times, Real Networks, etc.), and any other information that may characterize the general format and delivery of the stream (e.g., this stream operates from 9 a.m. to 9 p.m., etc.). Metadata may include "hard" metadata that is inherent in the broadcast or distribution and includes the format of the stream, the data rate, the length of the stream or size of the associated file, the video resolution (height, width, and color depth), the sound characteristics (stereo or mono), etc., and "soft" metadata that is associated with the content of the stream and includes, title, performer, copyright, genre, topic, etc. Once the analysis module 170 has completed the characterization of multimedia streams in the database, the analysis module may configure one or more stream listeners 180 to monitor the streams.

It will be appreciated that stream listeners 180 can be configured in a variety of different ways to monitor real-time multimedia streams 155a-155n. The purpose of each stream listener 180 is to monitor a multimedia stream and identify any transient resource that is contained within the stream. Once a transient resource is identified in a multimedia stream, stream listener 180 updates a transient multimedia database 185 with the identity of the transient resource. As noted above, many real-time data streams will include an in-band or an out-of-band signal that provides metadata about the particular transient resource that is contained in the stream. Some media formats specify that a header be transmitted prior to any streaming content, the header containing metadata information about the streaming content that is to follow. For example, Windows Media format streams can include metadata in the metafile or in the header of the stream, whereas MP3 format streams can include the metadata in ID3 tags in the header or at the end of the file. Depending upon the format of the real-time stream, a stream listener 180 may be required to continuously monitor the stream in order to detect the presence of a header that precedes a transient resource in the stream. When a header is detected, the metadata associated with the transient resource is decoded and the information stored in the transient multimedia database 185. By continuously monitoring the real-time data streams, stream listeners 180 can detect all headers and insure that the transient multimedia database accurately reflects the current content of the streams.

While continuous monitoring insures that the identity of transient resources will be detected in real-time data streams, from a resource standpoint continuous monitoring can be a very inefficient process as it requires a dedicated listener for each multimedia stream and a significant amount of bandwidth in order to simultaneously monitor all streams. As a result, the stream analysis module 170 preferably attempts to identify a sampling methodology that conserves system resources while at the same time insuring that the transient multimedia database 185 is as accurate as possible. The sampling methodology used by a listener is contingent in part upon the metadata format in the associated real-time data stream. Certain formats provide that the metadata associated with a resource in a stream is periodically rebroadcast during the delivery of the resource. When a stream is delivered in a format that repeats metadata in the stream, a stream listener may be able to periodically sample the stream in order to detect the metadata and update the transient multimedia database. To insure the accuracy of the index, the sampling rate should preferably be more frequent than the length of the smallest typical resource in the stream. That is, if each resource in a particular stream is always greater than two minutes in length, the listener can sample the resource stream at a higher rate (e.g., once every minute) in order to be confident that the metadata for each resource is accurately captured. Of course, the sampling of a stream should preferably be done as near to the beginning of the resource as possible in order to insure that a user that is searching for that resource will be able to access the resource at the beginning of the resource rather than at the end of the resource. Those skilled in the art will recognize that sampling on a more frequent basis will increase the likelihood of sampling a resource at the beginning, and that tradeoffs can be made between sampling rate, resource usage, and probability of resource detection. Additionally, in some stream formats an associated metadata-only component of the stream may be subscribed to by the listener without having to monitor the portion of the stream containing the media resources. In this case, a different rate and type of sampling may be appropriate to monitor the contents of the stream. In still other formats, such as when metadata is provided in an out-of-band manner, alternative sampling methodologies may be adopted. Some producers of real-time multimedia streams may provide a feed (such as an RSS feed) or a schedule on a web page that indicates when a particular transient resource is starting in a multimedia stream. If such an out-of-band signal is provided by a stream producer, listener 180 can utilize the out-of-band signal to detect the start of the resource (such as by receipt of a message via the feed) and update the transient multimedia database 185 with the metadata information provided in the out-of-band signal. Those skilled in the art will appreciate that other stream formats and methods of delivering metadata about transient resources contained in real-time multimedia streams may dictate other forms of stream listeners as well.

Still further facility resources can be conserved when the same real-time multimedia stream content is found to be delivered in multiple formats or data rates. For example, it is not unusual for multimedia stream producers to provide access to the same real-time stream content in each of a dominant media format, e.g., in Real Audio format and in Windows Media format. Similarly, within each format the multimedia stream producer may have the stream delivered in a variety of data rates that are optimized for a user's available bandwidth. As an example, a producer may deliver a high bandwidth Real Audio stream for users with a broadband connection and a low bandwidth Real Audio stream for users with a dialup connection. When the stream analysis module 170 identifies that the same real-time multimedia stream is merely being delivered in different formats or data rates, and when all of the streams are being delivered in a roughly synchronous manner, it is not necessary to configure a stream listener 180 to monitor each of these streams. Since the content contained in each real-time stream is the same, a single listener 180 could be configured to monitor a stream having a preferred format and data rate, and any metadata that the listener identifies about the monitored stream can be replicated in the transient multimedia database 185 for the streams in other formats and data rates. Alternatively, the facility may also start monitoring two real-time streams and only later determine that the streams are the same based on the identified resources in the streams. When such a similarity between streams is detected, the facility may opt to monitor only the stream having a preferred format and data rate. By monitoring only a single stream, a significant amount of facility resources can be conserved.

Soon after characterizing information about a transient resource is stored in the transient multimedia database 185, the transient multimedia index 110 is updated. The transient multimedia index is a searchable index that correlates search queries with records in the transient multimedia database. Transient multimedia index 110 may be created using any of a variety of techniques that are known in the art, including an inverted file or other index construction. Because the transient resources contained in real-time multimedia streams 155*a*-155*n* are typically of short duration, the transient multimedia index 110 is frequently updated to insure that searches of the transient multimedia database will remain highly accurate for users.

An interface module 190 is provided to allow users or web services to access and search the transient and static databases in order to identify multimedia resources. Inquiries in the form of search queries are submitted by users, web services, or other applications and presented to a search module 195. Using standard techniques, the search module 190 applies a search algorithm to parse the search query and apply the query against both the transient multimedia index 110 and the static multimedia index 120. The search queries may be performed simultaneously or sequentially, and the results merged by the search module. An example of search technology that may be useful in this context may be found in U.S. patent application Ser. No. 10/886,946 entitled "Internet Streaming Media Workflow Architecture" (filed 7 Jul. 2004) which is hereby incorporated by reference in its entirety. The search module 195 generates results from the transient multimedia database 185 and the static multimedia database 120 that are responsive to the search query, and returns the results to the interface module 190 in accordance with various parameters set by the user, web service, or other application. By presenting search results that contains both static and transient multimedia resources, the facility offers a much more compelling search experience.

Figure 2:
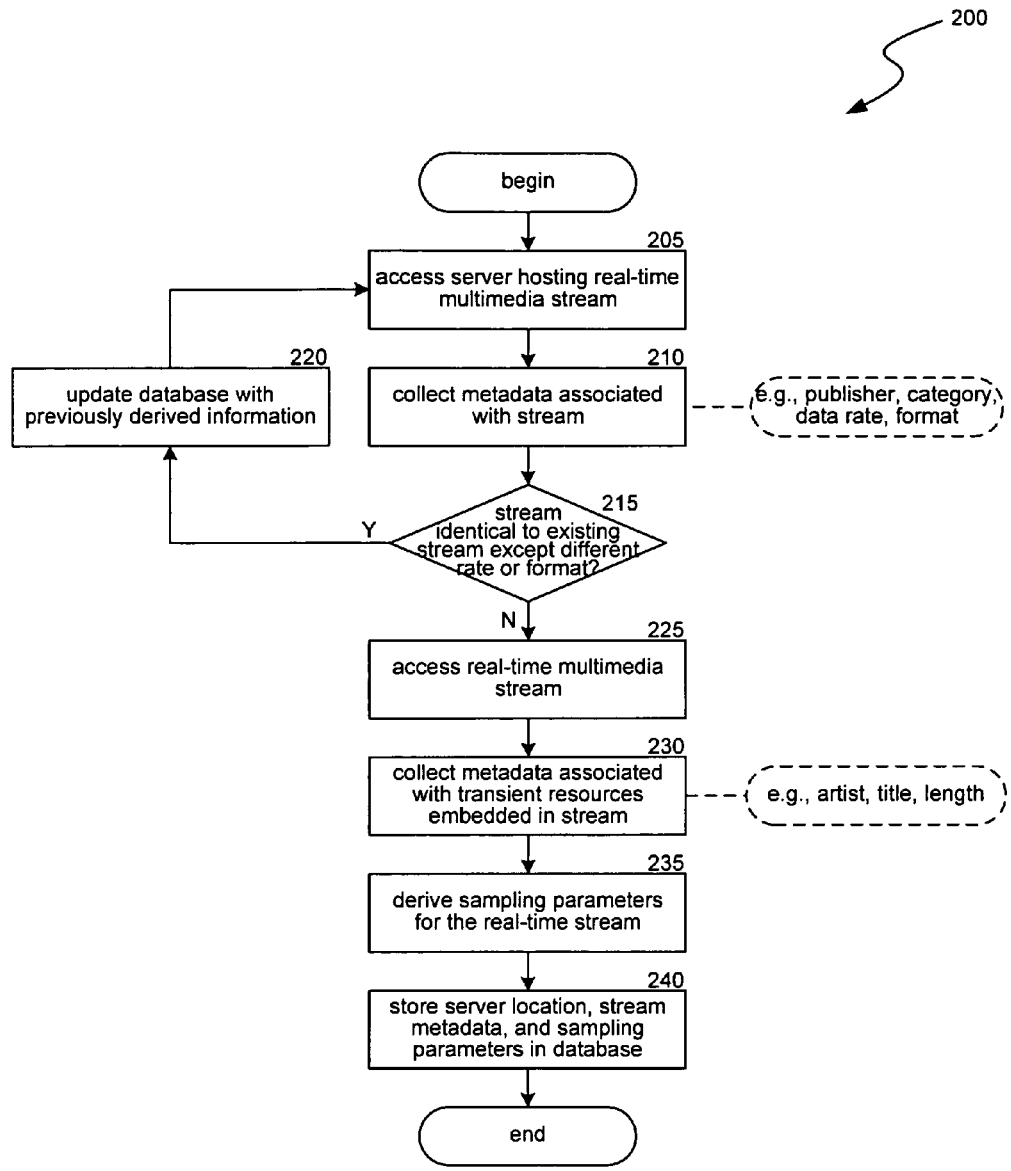
FIG. 2 is a flow diagram that illustrates the processing of real-time multimedia streams to generate a multimedia stream database.

FIG. 2 is a flow diagram that illustrates an analysis process 200 performed by multimedia stream analysis module 170 in order to characterize one of the real-time multimedia streams 155*a*-155*n*. An analysis is typically performed for each real-time multimedia stream identified in the database 160. At block 205, a server hosting the real-time multimedia stream is accessed, typically via a URL or other pointer to the stream location. At block 210, overarching metadata associated with the stream is collected. Such overarching metadata may include information such as the publisher, category, data rate, format, or any other information that is used to characterize the multimedia stream as a whole, as opposed to individual multimedia resources included in the stream. The metadata may be found in a number of different locations including, but not limited to, an initial header to the stream, in data on a web page associated with the stream, in third party characterizations that either point to or identify the multimedia stream, or in any other logical correlation that may reasonably be drawn, such as when multiple streams are generated by the same producer. At decision block 215, the facility determines whether the accessed multimedia stream is the same as that in a previously-analyzed stream. As discussed above, the content of two or more streams may be the same, even though the streams differ in format, data rate, or other characteristic not meaningful to the characterization of the content in the stream. If the real-time multimedia stream contains the same content as a previously-analyzed stream, at block 220 the real-time stream database 160 is updated to associate the previous metadata and other analysis with the new data stream. If the new stream under analysis does not contain the same content as an existing stream in the database, at block 225 the real-time multimedia data stream is accessed.

Once the real-time data stream is accessed, the stream is analyzed to validate that the listener is correctly configured to monitor the stream and to further characterize the stream beyond the overarching metadata previously collected. At block 230, metadata associated with the transient resources contained in the stream is collected. The collection of transient resource information in this preliminary analysis helps the facility to characterize the typical media resource contained within the stream. The real-time stream may therefore be monitored for a short period of time at block 230 until the facility achieves a reasonable degree of confidence as to the typical transient resource that may be embedded in the stream.

At block 235, sampling parameters are derived that optimize the sampling rate of the listener in order to monitor the real-time multimedia stream. Such sampling parameters may be based on a number of different factors, including but not limited to the rate at which metadata is provided in the stream and the availability of out-of-band metadata. Moreover, the sampling parameters may be tuned so that the sampling is no more frequent that the transient multimedia index can be updated.

At block 240, some of the derived information that characterizes the multimedia stream may be stored in the stream database 160, including, for example, a pointer or other index to where the stream may be accessed, the technical characteristics of the stream including format and rate, information about the content and publisher of the stream, and information about the sampling parameters necessary to monitor the stream. Such stored information is used to appropriately configure the stream listeners 180. Following block 240, the analysis process 200 of one of the multimedia streams terminates.

FIG. 3 is a block diagram of a sample data table 300 containing information that characterizes a real-time multimedia data stream 155a-155n. Table 300 generally contains three different types of information: (a) a source location 305 where the real-time multimedia data stream may be accessed; (b) a characterization 310 of the real-time stream; and (c) a set of sampling parameters 315 that may be used to assess how to monitor the real-time stream. Specifically, the source location 305 may be represented by a URL 320 or other pointer to a network address where a server provides access to a data stream. In addition to the source location, additional details characterizing the server performance or availability may also be stored. The characterization 310 of the stream may include a variety of data, including a format 325, a bit rate 330, a category (e.g., genre) 335, and other pieces of information that may be beneficial for the facility such as the identity of the publisher. The sampling parameters 315 may include a type 340 of the data stream to allow easy mapping of listeners to data streams. For example, a standard type of data stream may be a Windows Media data stream at a 128 k bit rate, which may be given a unique code (e.g., "category I stream") for subsequent mapping. Additional sampling parameters such as a rate 345 (e.g., every five seconds) or other characteristics that may be beneficial to defining the sampling may also be stored in the table 300.

Figure 4:
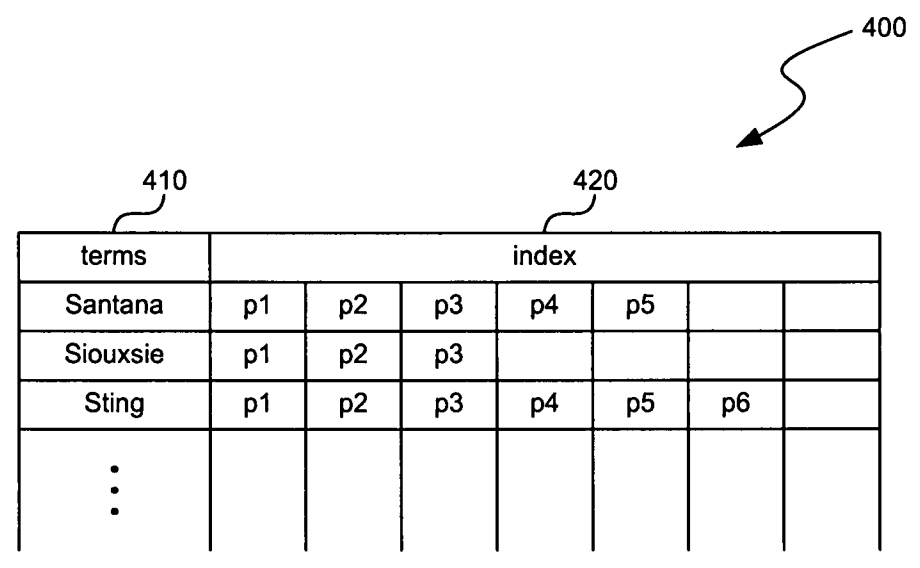

FIG. 4 is a block diagram illustrating the elements of the transient multimedia index 110 used by the facility to map words associated with transient resources to the transient resources. Table 400 includes terms 410 that are associated with one or more transient resources. The location of the mapped transient resources is identified by one or more pointers (p1, p2 . . . pn) or other values 420. Those skilled in the art will appreciate that table 400 may be an inverted index or other index structure optimized for the type of searching typically managed by the facility. Search queries are processed against the contents of the transient multimedia index and transient resources responsive to the query identified. The transient multimedia index 110 is continuously updated as the transient resources within the real-time multimedia streams 155a-155n are identified.

While FIGS. 3 and 4 depict tables whose contents and organization are designed to make them more comprehensible by a human reader, those skilled in the art will appreciate that the actual data structure(s) used by the facility to store this information may differ from the tables shown, in that they, for example, may be organized in a different manner, may contain more or less information than shown, may be compressed and/or encrypted, and may be optimized in a variety of ways.

Figure 5:
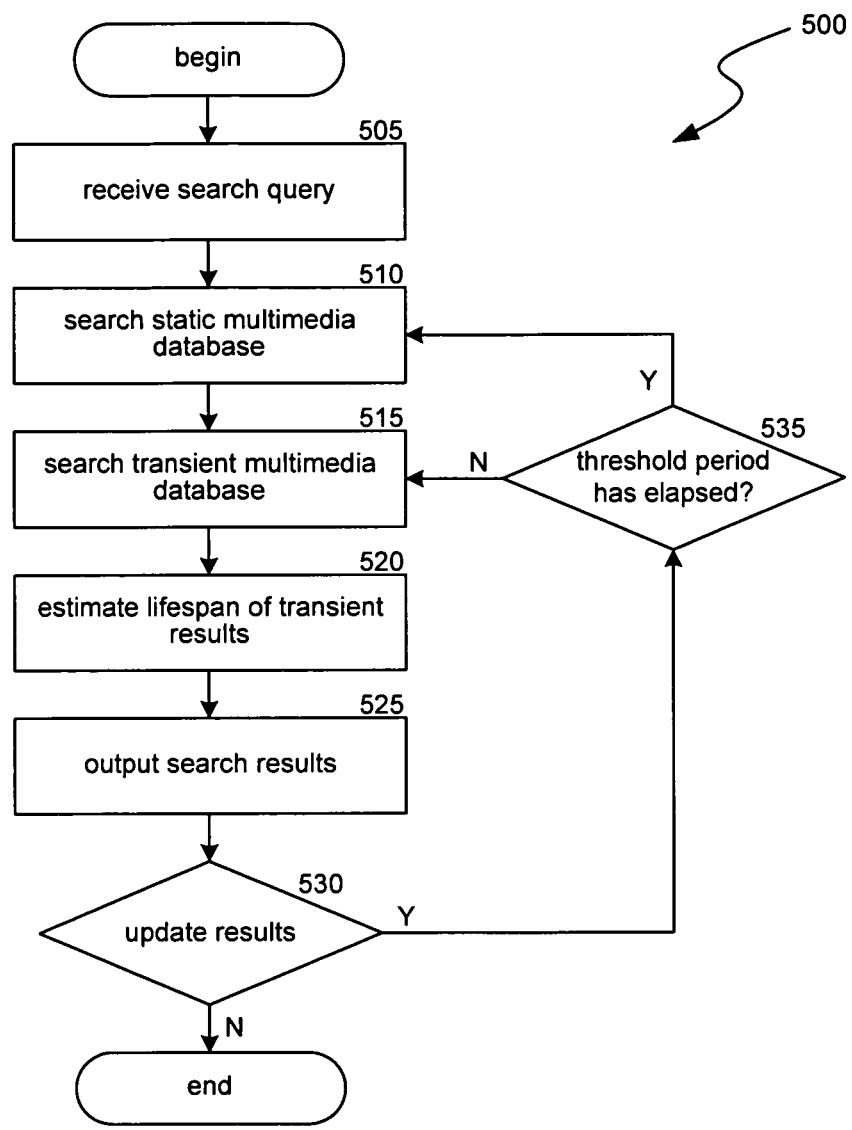
FIG. 5 is a flow diagram that illustrates the searching of a static multimedia database and the transient multimedia database to generate search results.

FIG. 5 is a flow diagram that illustrates a search process 500 that may be implemented by the search module 190. At block 505 a search query is received, typically in the form of one or more key words connected by one or more express or implied Boolean operators. Those skilled in the art will appreciate that other input means, such as drop-down menus, radio buttons, or other interfaces be used in lieu of or to supplement the key words in the search query. At block 510, a search is made of the static multimedia database 155 by using the static multimedia index 120 to identify those static resources that are responsive to the search query. At block 515, a search is made of the transient multimedia database 185 by using the transient multimedia index 110 to identify those transient resources that are responsive to the search query. The static and transient resources that are identified in response to the search query are dependent on the particular search algorithm that is used by the facility. It will be appreciated that different search algorithms may be used within each index, or within subportions of each index, to optimize the search for a particular type of resource.

At block 520, the facility optionally estimates the lifespan of the search results. Since the transient search results reflect the content within real-time streams, and since resources within the real-time streams are constantly changing, the transient resource results produced by the search process 500 will only be valid for a certain period of time. (In contrast, the static resource results can be considered to have an indefinite lifespan.) Such lifespan can be estimated if the approximate length of the identified transient resources is known, as well as the time that each of the transient resources started streaming. For example, if a stream listener 180 is monitoring an audio stream and detects a transition to a new song, a timestamp can be recorded in the transient multimedia database 185 that indicates when the new song started. Once the start time of the song is known, and the length of the song is also known from metadata associated with the song, then the facility can estimate the remaining time left in the song whenever a search query is received. If such an analysis were performed for all transient resources contained in a search result, the facility would know exactly how long the search results would be valid before having to be refreshed. The refresh could be manually or automatically implemented, and may occur as soon as the resource having the smallest amount of remaining time ended. Refreshing the search results may take a variety of forms. New search results might be presented to the user, with expired transient resources being dropped from the list of search results. Alternatively, the same search results might be presented, but with a graphical indication to the user (such as an icon or a red font color) indicating that certain transient resources in the search results are no longer available. The estimate performed at block 520 may obviously be omitted if such estimated information is not going to be presented to a user or used in another fashion.

At block 525, the facility outputs the search results which may include both static multimedia resources and transient multimedia resources. The static and transient resources may be intermixed, or they may be separately identified. As discussed in greater detail below, the amount of detail and format of the results may also vary considerably. If the lifespan of the transient resources has been previously determined in block 520, at block 525 the facility may elect to omit certain transient results that are reaching the end of their availability. For example, if only 5 seconds of a song remains in an audio stream when the search results are being formatted for being output, the song may be omitted from the results so that a user is not presented with results that have such a short effective life as to not be useful.

At decision block 530, the results may be periodically updated. Such update may occur based on a manual refresh requested by the user. Alternatively, such update may occur automatically when the facility determines that the lifespan of some or all of the transient results has expired. Since the index for the static multimedia resources is not refreshed very frequently, updating the results may require only a new search of the transient multimedia database. As a result, if an update is to occur the facility loops to a decision block 535. At block 535, an analysis if made to determine whether a threshold period of time has elapsed since the results have been delivered. If a threshold period has elapsed, the facility returns to block 510 and an updated search of both the static and the transient databases are performed. If an extended period has not elapsed, the facility instead returns to block 515 and only an updated search of the transient multimedia database is performed. The threshold period of time may be set based on how frequently the static multimedia database and index is updated.

Figure 6:
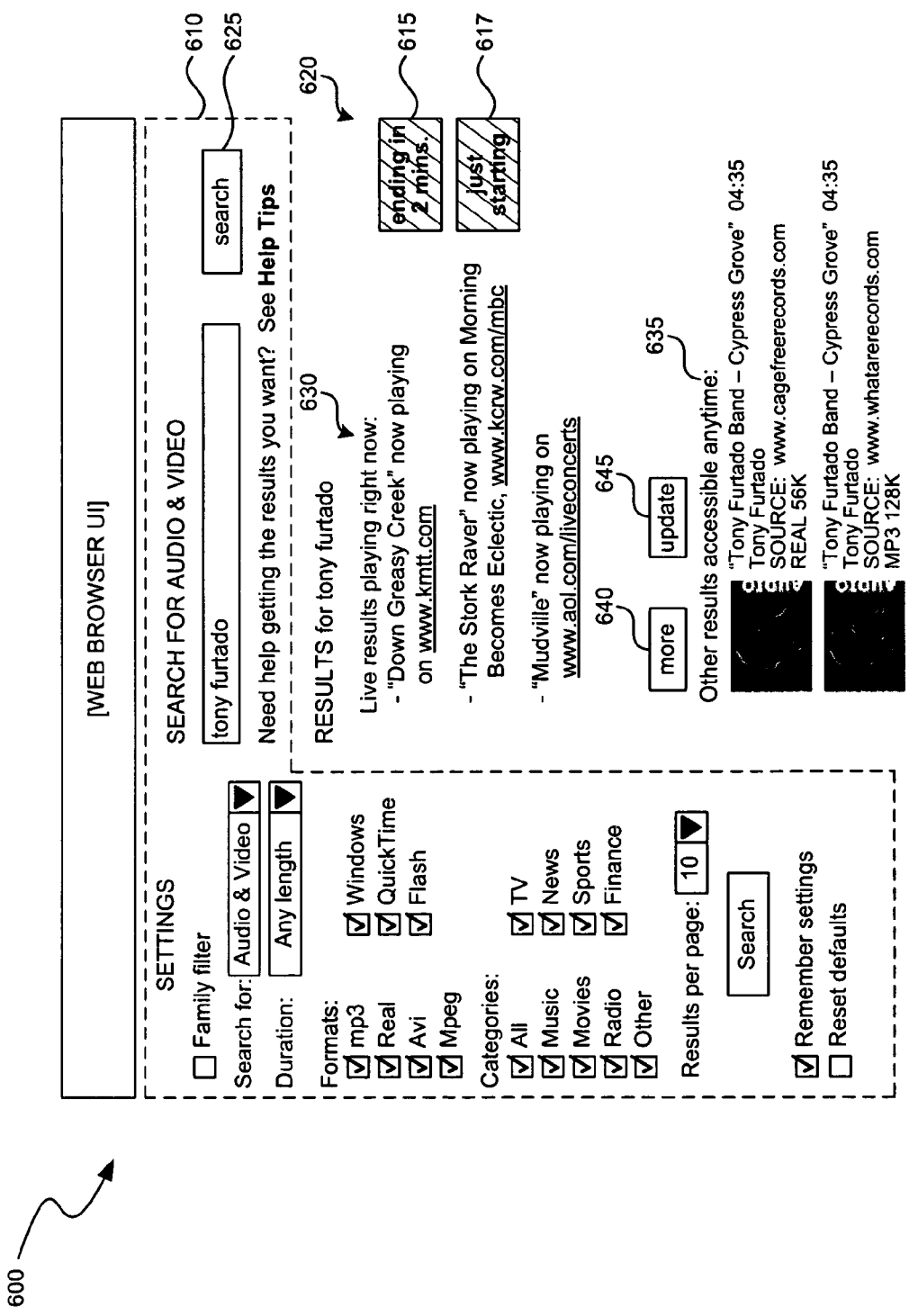
FIG. 6 is a representative user interface depicting the results of a static and transient multimedia resource search.

FIG. 6 is an example of a user interface such as one that may be generated by the facility 100. User interface 600 is generally comprised of a search query specification area 610 and a search results area 620. The search query specification area 610 provides a text input box to allow a user to enter a series of key words associated with the media resource that the user is looking for, as well as a series of pull-down menus and check boxes to allow the user to further filter the results of the search. Controls depicted in the search query specification area 610 allow a user to specify a format of the media resource that the user is searching for, as well as the category, duration, and number of desired results per page. After a user has entered the desired search settings, the user selects a search button 625 to initiate the search process.

Search results area 620 present the results of the search after the user has specified the search query and clicked on the search button 625. As depicted in FIG. 6, the search results may be separated into two different categories. One category 630, includes only those transient media resources that the facility has identified. The second category 635, includes only those static media resources that the facility has identified. The search results of transient resources may include a visual indication to the user as to the remaining time that each result will be accessible to the user. For example, one indication 615 shows that the resource is "ending in 2 minutes," while another indication 617 indicates that the resource is "just starting." While such visual indication is represented as a text message that is associated with some of the search results in FIG. 6, it will be appreciated that the visual indication could take a number of different forms, including an icon, a countdown timer, color-coding of the search result, or any other representation that would suggest to the user the length of remaining time to access the search result. The transient search result category 630 also includes two buttons that a user may use to modify the results. The user may activate or select a "more" button 640 to request that additional transient resources (that is, additional results that were identified but were not displayed since they were considered to be less relevant to the user) be displayed to the user. The user may also activate or select an "update" button 645 to refresh the entire list of transient results. The update button allows the user to manually refresh the search results if, for example, one or more of the transient media resources that are included in the search results has ended. Alternatively, the update button may be omitted and the system can automatically refresh results when one of the resources is no longer available to the user.

It will be appreciated that the user interface depicted in FIG. 6 is merely representative, and the search results could be presented in many different forms. For example, transient and static media resources could be intermixed in the same results list and ordered in accordance with how strongly correlated they are with the search query. Moreover, a user may request that only static results or only transient results be displayed, depending upon the type of media resource that they are primarily interested in locating. The amount of information provided about each resource may also vary. Static resources may be presented with a greater amount of detail because the user typically has a greater number of search results from which to select. Transient resources may be presented with a lesser amount of detail, since the user will need to review and select a particular resource in a timely fashion.

While various embodiments are described in terms of the environment described above, those skilled in the art will appreciate that the facility may be implemented in a variety of environments including a single, monolithic computer system, a distributed system, as well as various other combinations of computer systems or similar devices connected in various ways. Moreover, the facility may utilize third-party services and data to implement all or portions of the aforementioned functionality. Those skilled in the art will also appreciate that the steps shown in FIGS. 2 and 5 may be altered in a variety of ways. For example, the order of the steps may be rearranged, substeps may be performed in parallel, steps may be omitted, or other steps may be included.

While the foregoing description makes reference to particular embodiments, the scope of the invention is defined solely by the claims that follow and the elements recited therein.

We claim:

1. A method in a computing system to locate media content on a network, the method comprising:
    identifying content on the network, the identified media content including transient media content and static media content;

generating a first catalog containing information associated with the identified transient media content, each piece of transient media content being contained in one of a plurality of streaming real-time data streams associated with at least one stream listener configured to periodically sample metadata, including rebroadcasted metadata, to identify transient media content that is accessible when the piece of transient media content is contained in a corresponding real-time data stream;

determining a sampling rate associated with the at least one stream listener that is at least more frequent that than the length of the smallest typical resource in the stream;

updating the first catalog in response to transient media content becoming identified by the at least one stream listener;

receiving a search request characterizing desired media content;

in response to receiving the search request:
   querying the first catalog of transient media content to identify transient media content responsive to the search request;
   querying a second catalog of static media content to identify static media content responsive to the search request, the static media content being accessible at any time and not contained in streaming real-time data streams;

merging the transient media content identified from the first catalog of transient media content with the static media content identified from the second catalog of static media content to produce search results that are responsive to the search request; and presenting a graphical representation of the search results indicating at least transient media content that is no longer available and transient media contenting having remaining time above a lifespan threshold.

2. The method of claim 1, further comprising displaying the search results so that the transient media content and the static media content are presented together.

3. The method of claim 2, further comprising determining a lifetime of at least one of the identified pieces of transient media content, the lifetime reflective of the length of time after a search request is received that the transient media content is still accessible via the network.

4. The method of claim 3, further comprising displaying an indicator of the lifetime for the transient media content.

5. The method of claim 4, wherein the indicator is an icon.

6. The method of claim 4, wherein the indicator is a countdown timer.

7. The method of claim 4, wherein the indicator is a display font of the transient media content.

8. The method of claim 4, wherein the indicator is a display color of the transient media content.

9. The method of claim 3, further comprising:
(a) re-querying the first catalog of transient media content when the lifetime of at least one piece of the transient media content has expired to identify updated transient media content responsive to the search request; and
(b) re-displaying the search results so that the updated transient media content and the static media content are presented together.

10. The method of claim 9, wherein the re-querying is performed automatically after the lifetime of the at least one piece of the transient media content has expired.

11. A method of constructing a catalog to allow searching for transient media content accessible via a network, the method comprising:

searching a network to identify a plurality of real-time data streams containing media content based on temporal properties associated with access to media on the network;

determining a sampling rate associated with the at least one stream listener that is at least more frequent that than the length of the smallest typical resource in the stream;

monitoring the plurality of real-time data streams via at least one stream listener configured to periodically sample metadata, including rebroadcasted metadata, to identify a piece of media content contained within the one or more real-time data streams, wherein the piece of media content is only accessible when the media content is contained in the corresponding real-time data stream;

when a piece of media content is identified in one of the plurality of real-time data streams, updating a catalog containing information relating only to the real-time data streams to reflect the identified media content contained in the associated real-time data stream; and presenting a graphical representation of the search results indicating at least transient media content that is no longer available and transient media contenting having remaining time above a lifespan threshold.

12. The method of claim 11, wherein monitoring the plurality of real-time data streams involves monitoring changes in the metadata.

13. The method of claim 11, wherein the rate of periodic monitoring depends on a format of the real-time data streams.

14. The method of claim 11, wherein the plurality of real-time data streams are monitored using an out-of-band signal.

15. The method of claim 11, wherein the plurality of real-time data streams are monitored using an in-band signal.

16. The method of claim 11 further comprising:
identifying two or more real-time data streams that contain the same media content; and
monitoring only one of the identified real-time data streams.

17. The method of claim 16, wherein the identified real-time data streams are in different formats.

18. The method of claim 16, wherein the identified real-time data streams are at different rates.

19. The method of claim 11, wherein the step of monitoring the plurality of real-time data streams further comprises:
(a) identifying at least one transmission characteristic associated with each of the plurality of real-time data streams; and
(b) sampling each of the plurality of real-time data streams to identify a piece of media content contained within each sampled real-time data stream, wherein the sampling methodology is based in part on an identified transmission characteristic associated with the sampled real-time data stream.

20. The method of claim 19, wherein the sampling uses an in-band signal associated with each real-time data stream.

21. The method of claim 19, wherein the in-band signal is header packets contained in each real-time data stream.

22. The method of claim 19, wherein the sampling uses an out-of-band signal associated with each real-time data stream.

23. The method of claim 22, wherein the out-of-band signal is a feed associated with each real-time data stream.

24. The method of claim 22, wherein the out-of-band signal is a message associated with each real-time data stream.

25. The method of claim 19 further comprising:
identifying two or more real-time data streams that contain the same media content but have different transmission characteristics; and
sampling only one of the identified real-time data streams.

26. A system for monitoring a plurality of real-time data streams accessible via a network to identify media content contained within the plurality of data streams, the system comprising:
- a processor and a memory;
- an index containing information associated with a plurality of real-time data streams associated with at least one stream listener configured to periodically sample metadata, including rebroadcasted metadata, to identify transient media content that is accessible via a network, the index containing information characterizing each of the plurality of real-time data streams and excluding information associated with static media resources, wherein the index is updated in response to transient media content becoming identified by at least one stream listener of the plurality of data stream listeners and the static media resources being accessible at any time and not contained in streaming real-time data streams;
- a plurality of data stream listeners that are each configured to detect media content contained within a real-time data stream sampled at a rate that is at least more frequent that than the length of the smallest typical resource in the stream and based on temporal properties associated with access to detected the media content, each piece of media content being accessible when it is contained in the corresponding real-time data stream
- a controller coupled to the index and the plurality of data stream listeners, wherein, based on information characterizing each of the plurality of real-time data streams, the controller correlates each of the plurality of data stream listeners with one or more of the plurality of real-time data streams in order to detect media content contained within said data streams; and
- a display module for presenting a graphical representation of search results indicating at least transient media content that is no longer available and transient media contenting having remaining time above a lifespan threshold.

27. The system of claim 26, wherein the metadata is received as a component of a real-time data stream.

28. The system of claim 26, wherein the metadata is received as an out-of-band signal associated with a real-time data stream.

29. The system of claim 26, wherein the controller doesn't correlate a data stream listener with a real-time data stream if the real-time data stream contains the same media content as another real-time data stream that is already correlated with a listener.

30. A system for displaying media content responsive to a search query, the system comprising:
- a processor and a memory;
- a first catalog containing information associated with transient media content accessible via a network based on temporal properties associated with access, wherein transient media content is associated with at least one stream listener configured to periodically sample metadata at a rate that is at least more frequent that than the length of the smallest typical resource in the stream, including rebroadcasted metadata, to identify transient media content that is associated with a streaming data stream, and wherein each piece of transient media content is accessible when contained in the streaming data stream, wherein the first catalog is updated in response to transient media content becoming identified by the at least one stream listener;
- a first search index mapped to the first catalog of transient media content, the first search index being queriable to identify transient media content that is responsive to a search query;
- a second search index mapped to a second catalog of static media content, the second search index being queriable to identify static media content that is responsive to a search query;
- a search module for receiving a search query, querying the first search index and the second search index in order to identify transient media content and static media content, that is responsive to the search query, the static media content being accessible at any time and not contained in streaming real-time data streams, and compiling the identified transient media content and static media content into a set of search results, and
- a display module for presenting a graphical representation of the search results indicating at least transient media content that is no longer available and transient media contenting having remaining time above a lifespan threshold.

31. The system of claim 30, wherein the first search index is updated whenever information about a new piece of transient media content is added to the catalog.

32. The method of claim 1, wherein the characterizing further comprises:
- identifying metadata associated with the identified media content;
- determining, based on the metadata, that the identified media content has temporal restrictions on user access;
- characterizing the identified media content as transient media based on the determination.

33. The method of claim 32, wherein the determination of temporal restrictions is based on identified header tags of the metadata.

* * * * *

UNITED STATES PATENT AND TRADEMARK OFFICE
CERTIFICATE OF CORRECTION

PATENT NO. : 8,577,889 B2  Page 1 of 1
APPLICATION NO. : 11/489273
DATED : November 5, 2013
INVENTOR(S) : Austin D. Dahl et al.

It is certified that error appears in the above-identified patent and that said Letters Patent is hereby corrected as shown below:

In the Claims

Claim 1, Col. 13, Line 35, "contenting" should read as --content--.

Claim 11, Col. 14, Line 21, "contenting" should read as --content--.

Claim 26, Col. 15, Line 23, "detected the media" should read as --detected media--.

Claim 26, Col. 15, Line 23, "stream" should read as --stream;--.

Claim 26, Col. 15, Lines 34-35, "contenting" should read as --content--.

Claim 29, Col. 15, Line 42, "doesn't" should read as --does not--.

Claim 30, Col. 16, Line 29, "results, and" should read as --results; and--.

Claim 30, Col. 16, Line 33, "contenting" should read as --content--.

Signed and Sealed this
Eighteenth Day of February, 2014

Michelle K. Lee
*Deputy Director of the United States Patent and Trademark Office*